United States Patent
Gbur et al.

(10) Patent No.: US 6,341,165 B1
(45) Date of Patent: Jan. 22, 2002

(54) CODING AND DECODING OF AUDIO SIGNALS BY USING INTENSITY STEREO AND PREDICTION PROCESSES

(75) Inventors: Uwe Gbur, Berlin; Martin Dietz, Nürnberg; Karlheinz Brandenburg, Erlangen; Heinz Gerhauser, Waischenfeld; Jürgen Herre, Buckenhof, all of (DE); Schuyler Quackenbush, Westfield, NJ (US)

(73) Assignees: Fraunhofer-Gesellschaft zur Förderdung der Angewandten Forschung E.V., Munich (DE); AT&T Laboratories/Research, Florham Park; Lucent Technologies, Bell Laboratories, Murray Hill, both of NJ (US)

( * ) Notice: Subject to any disclaimer, the term of this patent is extended or adjusted under 35 U.S.C. 154(b) by 0 days.

(21) Appl. No.: 09/214,655

(22) PCT Filed: Jun. 3, 1997

(86) PCT No.: PCT/EP97/02875

§ 371 Date: May 28, 1999

§ 102(e) Date: May 28, 1999

(87) PCT Pub. No.: WO98/03037

PCT Pub. Date: Jan. 22, 1998

(30) Foreign Application Priority Data

Jul. 12, 1996 (DE) .......................... 196 28 293

(51) Int. Cl.$^7$ ................................................ H04R 5/00
(52) U.S. Cl. ................................ 381/23; 381/22; 381/2
(58) Field of Search ........................ 381/1, 2, 20, 22, 381/23, 56, 58, 59; 700/94; 704/229, 230

(56) References Cited

U.S. PATENT DOCUMENTS

| | | | |
|---|---|---|---|
| 4,815,132 A | | 3/1989 | Minami |
| 5,481,643 A | * | 1/1996 | Ten kate et al. ................. 381/2 |
| 5,491,773 A | | 2/1996 | Veldhuis |
| 5,544,247 A | * | 8/1996 | Ten kate ........................ 381/2 |
| 5,621,855 A | * | 4/1997 | Veldhuis et al. ............. 704/229 |
| 5,636,324 A | * | 6/1997 | Teh et al. .................... 704/230 |
| 5,701,346 A | * | 12/1997 | Herre et al. .................. 381/23 |
| 5,736,943 A | * | 4/1998 | Herre et al. ................... 381/2 |
| 5,812,672 A | * | 9/1998 | Herre et al. .................. 381/23 |
| 5,812,971 A | * | 9/1998 | Herre ......................... 704/230 |
| 5,926,553 A | * | 7/1999 | Keyhl et al. ................... 381/2 |

FOREIGN PATENT DOCUMENTS

| | | |
|---|---|---|
| EP | 0497 413 A1 | 8/1992 |
| EP | 0530 916 A2 | 3/1993 |
| EP | 0599 824 A2 | 6/1994 |
| EP | 797324 * | 9/1997 .................. 381/2 |

OTHER PUBLICATIONS

J.D. Markel and A.H.Gray, Jr., "Linear Prediction of Speech" Springer–Verlag Berlin Heidelberg New York, 1976.

* cited by examiner

*Primary Examiner*—Minsun Oh Harvey
*Assistant Examiner*—Xu Mei
(74) *Attorney, Agent, or Firm*—Dougherty & Clements LLP

(57) ABSTRACT

In the coding and decoding of stereo audio spectral values both the intensity stereo process and prediction are used in order to achieve high data compression. If intensity stereo coding is active in one section of scale factor bands, the prediction for the right channel in that range is deactivated, whereby the results of the prediction are not used to form the coded stereo audio spectral values. To allow further adaptation of the prediction for the right channel, the predictor of the right channel is fed with stereo audio spectral values for the channel, which again are intensity stereo decoded.

16 Claims, 5 Drawing Sheets

CODING AND DECODING OF AUDIO SIGNALS BY USING INTENSITY STEREO AND PREDICTION PROCESSES

FIELD OF THE INVENTION

The invention relates to the coding and decoding of audio signals, and particularly to the coding and decoding of audio signals using an intensity stereo process and a prediction.

BACKGROUND ART AND DESCRIPTION OF PRIOR ART

The most advanced audio coding and decoding processes, operating e.g. to the MPEG Layer 3 standard, can compress the data rate of digital audio signals e.g. by a factor of twelve without markedly lowering their quality.

Apart from a great coding gain in the individual channels, e.g. the left channel L and right channel R, the relative redundancy and irrelevance of the two channels are also utilised in the case of stereo. The known methods which have already been used are the so-called MS stereo process (MS=centre-side) and the intensity stereo process (IS process).

The MS stereo process, which is known in the art, substantially utilises the relative redundancy of the two channels, with a sum of the two channels and a difference between them being calculated, then transmitted as modified channel data for the left and right channel respectively. That is to say, the MS stereo process has a precisely reconstructing action.

Unlike the MS stereo process, the intensity stereo process chiefly makes use of stereo irrelevance. It should be mentioned in connection with stereo irrelevance that the spatial perception of the human hearing system depends on the frequency of the audio signals perceived. At low frequencies both amount information and phase information in the two stereo signals is evaluated by the human hearing system, and perception of high frequency components is based mainly on analysis of the energy-time envelopes of both channels. Thus the exact phase information in the signals in both channels is not relevant to spatial perception. This feature of human hearing is utilised to make use of the stereo-irrelevance for further data reduction of audio signals by the intensity stereo process.

As the stereo intensity process cannot resolve precise local information at high frequencies, it is possible to transmit a joint energy envelope for both channels instead of two separate stereo channels L, R, from an intensity frequency limit defined in the encoder. In addition to the joint energy envelope roughly quantised direction information is also transmitted as side information.

As a channel is only partially transmitted when intensity stereo coding is used, the saving of bits may be up to 50%. It should be noted however that the IS process does not have a precisely reconstructing action in the decoder.

In the IS process hitherto employed in the MPEG standard, Layer 3, the fact that the IS process is active in a block of stereo-audio spectral values is indicated by a so-called mode_extension_bit, and each block has a mode_extension_bit assigned to it.

A theoretical representation of the known IS process is given in FIG. 1. Stereo-audio spectral values for a channel L 10 and a channel R 12 are totalled at a summation point 14 to obtain an energy envelope $I=L_i+R_i$ for the two channels. $L_i$ and $R_i$ here represent the stereo-audio spectral values of the respective channels L and R in any scale factor band. As already mentioned, use of the IS process is only permissible above a certain IS frequency limit, in order to avoid inserting coding errors into the stereo-audio spectral values coded. The left and right channels therefore have to be coded separately within a range from 0 Hz to the IS frequency limit. The IS frequency limit as such is determined in a separate algorithm which does not form part of the invention. From this frequency limit upwards the encoder codes the total signal of the left channel 10 and right channel 12, formed at the summation point 14.

Scaling information 16 for channel L and scaling information 18 for channel R are necessary for decoding in addition to the energy envelope, i.e. the total signal of the left and right channels, which may e.g. be transmitted in the coded left channel. Scale factors for the left and right channels are transmitted in the intensity stereo process as implemented e.g. in MPEG Layer 2. However it should be mentioned here that, in the IS process in MPEG Layer 3 for IS-coded stereo-audio spectral values, intensity direction information is transmitted only in the right channel, and the spectral values are decoded again with this information as explained below.

The scaling information 16 and 18 is transmitted as side information in addition to the coded spectral values of channel L and channel R. A decoder delivers audio signal values decoded in a decoded channel L' 20 and a decoded channel R' 22, and the scaling information 16 for channel R and 18 for channel L is multiplied by the decoded stereo-audio spectral values for the respective channels in an L multiplier 24 and an R multiplier 26, as a means of decoding the originally coded stereo-audio spectral values.

Before IS coding is applied above a certain IS frequency limit or MS coding below that limit the stereo audio spectral values for each channel are grouped into so-called scale factor bands. The bands are adapted to the perception properties of the hearing system. Each band may be amplified with an additional factor, the so-called scale factor, which is transmitted as side information for the particular channel and which constitutes part of the scaling information 16 and 18 in FIG. 1. These factors are responsible for the formation of an interfering noise which is introduced by quantisation, in such a way that it is "masked" in respect of psycho-acoustic aspects and thus becomes inaudible.

FIG. 2a shows a format of the coded right channel R, used e.g. in an MPEG Layer 3 audio coding process. Any further mention of intensity stereo coding will relate to the MPEG layer 3 standard process. The individual scale factor bands 28, into which the stereo audio spectral values are grouped, are shown diagrammatically in the first line of FIG. 2a. In FIG. 2a these bands are shown equal in width purely for clarity; in practice their widths will not be equal, owing to the psycho-acoustic properties of the hearing system.

The second line of FIG. 2a contains coded stereo audio spectral values sp, which are non-zero below an IS frequency limit 32; the stereo audio spectral values in the right channel above the IS frequency limit are set to zero (zero_part) nsp, as already mentioned (nsp=zero spectrum).

The third line of FIG. 2 contains part of the side information 34 for the right channel. The part of the information 34 shown firstly comprises the scale factors skf for the range below the IS frequency limit 32 and the direction information rinfo 36 for the range above the frequency limit. The direction information is used to ensure rough local resolution of the IS coded frequency range in the intensity stereo process. Thus the direction information rinfo 36, also referred to as intensity positions (is_pos), is transmitted in the right channel instead of the scale factors. It should be mentioned again that the scale factors 34 corresponding to the scale factor bands 28 are still present in the right channel below the IS frequency limit. The intensity positions 36 indicate the perceived stereo imaging position (the ratio of left to right) of the signal source within the respective scale factor bands 28. In each band 28 above the IS frequency limit the decoded values of the stereo audio spectral values transmitted are scaled by the MPEG Layer 3 process, with the following scaling factors $k_L$ for the left channel and $k_R$ for the right one:

$$k_L = \text{is\_ratio}/(1+\text{is\_ratio}) \quad (1)$$

and $$k_R = 1/(1+\text{is\_ratio}) \quad (2)$$

The equation for is_ratio is as follows:

$$\text{is\_ratio} = \tan(\text{is\_pos} \cdot \pi/12) \quad (3)$$

The value is_pos is quantised with 3 bits, only the values from 0 to 6 being valid position values. The left and right channels can be derived from the I signal ($I = L_i + R_i$) in the following two equations:

$$R_i = I \cdot \text{is\_ratio}/(1+\text{is\_ratio}) = I \cdot k_L \quad (4)$$

$$L_i = I \cdot 1/(1+\text{is\_ratio}) = I \cdot k_R \quad (5)$$

$R_i$ and $L_i$ are the intensity stereo decoded stereo audio spectral values. It should be mentioned here that the left channel format is analogous to the right channel format shown in FIG. 2a, although the combined spectrum $I = L_i + R_i$ rather than the zero spectrum is to be found above the IS frequency limit 32 in the left channel, and although ordinary scale factors are present rather than direction information is_pos for the left channel. The transition from the quantised total spectral values of non-zero to the zero values in the right channel can implicitly indicate the IS frequency limit to the decoder in MPEG Layer 3 standard.

The transmitted channel L is thus calculated in the encoder as the sum of the left and right channels, and the direction information transmitted may be defined by the following equation:

$$\text{is\_pos} = \text{nint}[\arctan(\sqrt{E_L}/\sqrt{E_R}) \cdot 12/\pi] \quad (6)$$

The nint[x] function represents the "next whole number" function, $E_L$ and $E_R$ being the energy in the respective scale factor bands of the left and right channels. This formulation of the encoder/decoder gives an approximate reconstruction of signals in the left and right channels.

The intensity stereo process is described in R G v d Waal, R N J Veldhuis: "Subband Coding of Stereophonic Digital Audio Signals", IEEE ICASSP, pages 3601–3604, and in J Herre, K Brandenburg, D Lederer: "Intensity Stereo Coding", 96th AES Convention, Amsterdam 1994, Preprint 3799.

The use of prediction is already known in coding and decoding by means of an NBC encoder. Second order, backward adaptive prediction is used in particular. "Backward adaptive" means that no predictor coefficients need be transmitted, as the predictor in the encoder and in the decoder is fed with the same input signals. The prediction means in the decoder can consequently derive the prediction coefficients itself.

The mode of operation of a predictor is basically to supply an estimated value for the current signal based on the preceding input values. For tonal signals, i.e. signals with a rather narrow spectrum, the predictor error signal, i.e. the difference between the original spectrum and the estimated value, is considerably smaller than the original spectrum, and the prediction error signal can consequently be coded with less bits, thus producing further substantial data compression. Thus only this quantised prediction error signal is transmitted. The predictor of the decoder can derive the original signal from it.

If the input signals of the predictor are not tonal, as is the case e.g. with audio-signals representing audience applause, the prediction error signal may become stronger than the original signal. Prediction then produces a bit loss, i.e. it leads to an increase in the quantity of data to be coded. For this reason prediction may be switched on and off scale factor bandwise. Like intensity direction information, information as to whether prediction is used in a scale factor band or not is transmitted as side information.

If intensity stereo coding and prediction are to be used simultaneously in coding stereo audio spectral values, the following problem arises. The intensity stereo algorithm takes place before the prediction. This sequence is inevitable, as there would be no sense in producing a joint energy envelope for both channels and intensity direction information from prediction error signals. As already mentioned, the right channel containing the stereo audio spectral values 30 is set to zero in IS coding, as shown in FIG. 2a or 2b. These zero values are the input values of a predictor for the right channel. As a predictor calculates an estimated value from at least one preceding input value, what happens when the processing switches from a scale factor band 28 below the intensity stereo frequency limit 32 to a band above that limit is that the stereo audio spectral values 30 of the right channel above the IS frequency limit—which is not always the same and has to be continuously determined dependent on the audio signal—abruptly become zero. The predictor however will still transmit non-zero estimates for a certain time, and the error signal to be coded will therefore also be non-zero. As a result non-zero audio spectral values would have to be transmitted above the IS frequency limit in the right channel 12, leading to a breach of the conditions for the actual intensity stereo process.

Possibly because of the said difficulty in encoding and decoding audio signals with simultaneous use of prediction and intensity stereo coding, the two processes have not hitherto been used together, although simultaneous use of prediction and the IS process would assist in further compression of the data to be encoded. If the intensity stereo process is not used at all, to enable prediction to be carried out without any problems, the above-mentioned advantages of intensity stereo coding for data compression are not exploited. Another possibility would be to compress only the stereo audio spectral values below the intensity stereo frequency limit by means of a predictor, and to encode the stereo audio spectral values above the IS frequency limit 32 exclusively by the intensity stereo process. Prediction of the stereo audio spectral values 30 in the left channel above the intensity stereo frequency limit would however allow additional compression of the data to be encoded.

SUMMARY OF THE INVENTION

The problem of the invention is to provide a method of coding stereo audio spectral values, a method of decoding coded stereo audio spectral values, an apparatus for coding stereo audio spectral values or an apparatus for decoding coded stereo audio spectral values, wherein increased data compression is possible.

In accordance with a first aspect of the present invention, this problem is solved by a method of coding stereo audio spectral values, to obtain coded stereo audio spectral values, comprising the following steps: grouping the stereo audio spectral values in scale factor bands, with which scale factors are associated; intensity stereo coding the stereo audio spectral values in at least one of the scale factor bands, whereby one channel has intensity stereo coded stereo audio spectral values and another channel has stereo audio spectral values with a value of substantially zero; if the stereo audio spectral values in a scale factor band are intensity stereo coded, intensity stereo decoding the intensity stereo coded stereo audio spectral values of one channel in the scale factor band, to obtain intensity stereo decoded stereo audio spectral values for the other channel; making a first prediction with the intensity stereo decoded stereo audio spectral values of the other channel in the scale factor band, the results of the first prediction not being taken into account when the stereo audio spectral values of the other channel are coded; if the stereo audio spectral values in a scale factor band are not intensity stereo coded, making the first prediction with the stereo audio spectral values of the other channel in the scale factor band, to obtain the coded stereo audio spectral values of the other channel.

In accordance with a second aspect of the present invention, this problem is solved by a method of decoding stereo audio spectral values which are coded partly by the intensity stereo process and partly by means of a first and a second prediction and which have side information, comprising the following steps: ascertaining the presence of intensity stereo coding or of the first or second prediction of the stereo audio spectral values, which are grouped in scale factor bands, for each individual band on the basis of the side information; making a prediction corresponding to the second prediction, with stereo audio spectral values coded by means of the second prediction, in one channel, in order to cancel the second prediction; if there is intensity stereo coding in a scale factor band, carrying out intensity stereo decoding of the intensity stereo coded stereo audio spectral values of the one channel, to form intensity stereo decoded stereo audio spectral values for the other channel; making the prediction corresponding to the first prediction, with the intensity stereo decoded stereo audio spectral values of the other channel, the results of the prediction not being taken into account with decoded stereo audio spectral values of the other channel; if there is no intensity stereo coding in a scale factor band, making the prediction corresponding to the first prediction, in the other channel to form the decoded stereo audio spectral values of the other channel.

In accordance with a third aspect of the present invention, this problem is solved by an apparatus for coding stereo audio spectral values, comprising: a means for grouping the stereo audio spectral values in scale factor bands, with which scale factors are associated; a means for intensity stereo coding the stereo audio spectral values in at least one of the scale factor bands, whereby one channel has intensity stereo coded stereo audio spectral values and the other channel has stereo audio spectral values with a value of substantially zero; an intensity stereo decoder for decoding the intensity stereo coded stereo audio spectral values in a scale factor band; and a first predictor in the other channel, which has first, second and third switches, the first, second and third switches being in a first state when intensity stereo coded stereo audio spectral values are present, and the first, second and third switches being in a second state when no intensity stereo coded stereo audio spectral values are present; wherein the first predictor makes a first prediction with the stereo audio spectral values of the other channel, decoded by the intensity stereo decoder, when the first, second and third switches are in the first state, but wherein the results of the prediction are not taken into account with the coded stereo audio spectral values owing to the position of the first switch; and wherein the predictor makes the first prediction of the stereo audio spectral values in the scale factor band, to obtain the coded stereo audio spectral values of the other channel, when the first, second and third switches are in the second state.

In accordance with a fourth aspect of the present invention, this problem is solved by an apparatus for decoding stereo audio spectral values which are coded at least partly by the intensity stereo process and a first and a second prediction and which have side information, comprising: a first re-predictor for one channel of stereo audio spectral values with an input and an output; a second re-predictor for another channel of stereo audio spectral values with an input and an output; an intensity stereo decoder with an input and an output; a first change-over means in the other channel for connecting the output of the intensity stereo decoder to the input of the second re-predictor when intensity stereo coded stereo audio spectral values are present, and for connecting the input of the second re-predictor to the other channel of stereo audio spectral values when those values are not stereo intensity coded; and a second change-over means in the other channel for connecting the output of the second re-predictor in the other channel to an output for decoded stereo audio spectral values of the other channel, when the stereo audio spectral values are not intensity stereo coded, and for connecting the input of the second predictor in the other channel to the output for the decoded stereo audio spectral values of the other channel, when those values are intensity stereo coded.

The invention is based on the discovery that increased data compression is made possible by joint use of prediction and stereo intensity coding of stereo audio spectral values, and for this purpose—in a further discovery of the invention—prediction has to be deactivated for the right channel if intensity stereo coding for stereo audio spectral values is activated in the corresponding scale factor band. To allow further appropriate adaptation of the prediction however, so that correct prediction values can be delivered in the case of stereo audio spectral values not coded by intensity stereo coding, the right channel predictor, which has a zero spectrum with intensity stereo coded stereo audio spectral values, must also be supplied with the intensity stereo decoded stereo audio spectral values for the right channel. If this is not done the predictor becomes maladjusted, with the result that the data compression gained by prediction drops considerably for a time when IS coding is disconnected.

For the right channel, with coding by the stereo intensity process, the right channel predictor must thus also keep operating to some degree; it is fed with the uncoded stereo audio spectral values of the right channel. However the results of the right channel prediction must not be considered for coding the stereo audio spectral values, in order to fulfil the intensity stereo condition that the stereo audio spectral values for a scale factor band above the intensity stereo frequency limit should be set to zero.

Accordingly further adaptation of the prediction must always be possible, i.e. updating of the prediction coefficients must be possible when IS coded scale factor bands with a certain mean frequency alternate with non-IS coded scale factor bands with substantially the same mean frequency. This may e.g. be the case if the IS frequency limit varies from one block to the next, or if a scale factor band above the IS frequency limit is IS coded in one block and IS decoded in a succeeding block as shown in FIG. 2b.

It has also already been mentioned that prediction can be deactivated scale factor bandwise in the case of highly non-tonal signals. But if, for example, there is audience applause the signals in that scale factor band will be tonal again, and hence prediction should be reactivated in the block which then has to be coded. Here again prediction must be capable of further adaptation, so that it supplies small prediction error signals, for high data compression, immediately after activation. In this application the terms "activation", "deactivation" or "connection" and "disconnection" of the prediction are accordingly used in the sense that the predictor continues to be fed with input values and makes a prediction to enable it to update its prediction coefficients, but that the results of the prediction are not considered in the encoded signals.

BRIEF DESCRIPTION OF THE DRAWINGS

Some preferred embodiments of the invention will now be explained in detail with reference to the accompanying drawings, in which.

DETAILED DESCRIPTION OF PREFERRED EMBODIMENTS OF THE PRESENT INVENTION

Figure 2A:
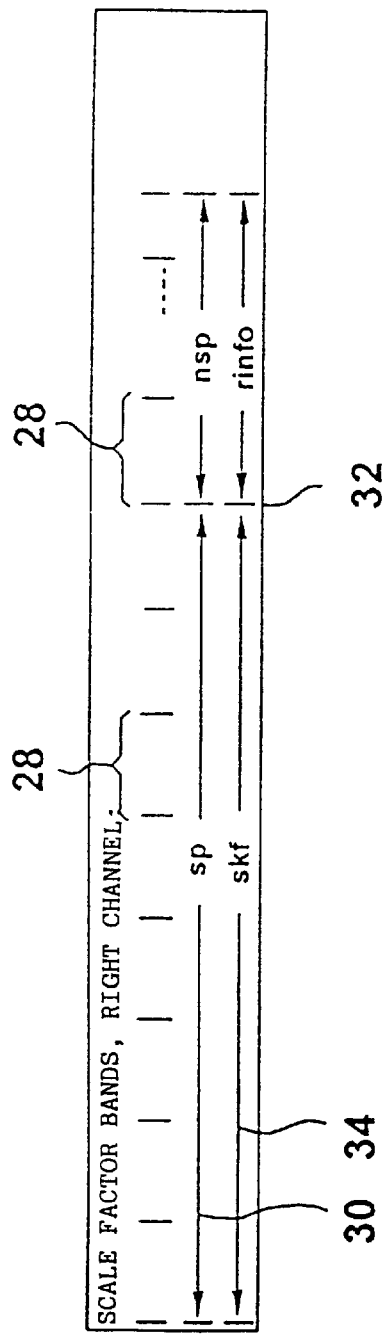
FIG. 2a shows a format of the data when there is stereo intensity coding for the right channel for MPEG Layer 3 standard.
Figure 2B:
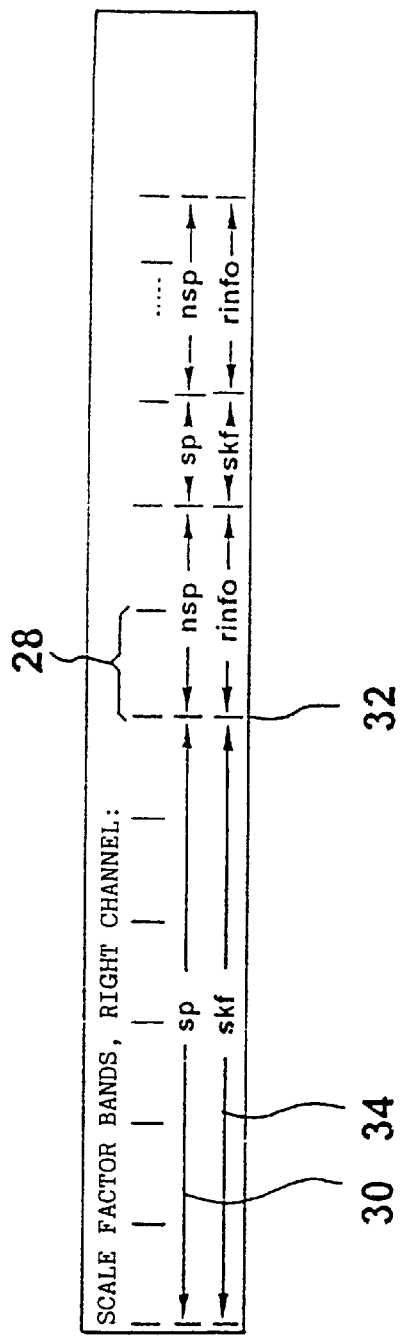
FIG. 2b shows a format of the data when there is stereo intensity coding for the right channel for the MPEG-NBC process.

FIG. 2b shows a format of the data for the right channel R with stereo intensity coding using the MPEG2-NBC process. The difference from FIG. 2a or the MPEG Layer 3 process is that a user of the MPEG2-NBC process has the flexibility, selectively to connect or disconnect intensity stereo coding of the stereo audio spectral values for a respective section, i.e. a group of at least one scale factor band, even above the IS frequency limit 32. Thus the IS frequency limit is not actually a true frequency limit compared to MPEG Layer 3, as the IS coding can be disconnected or connected again even above the IS frequency limit in the NBC process. This was not possible with Layer 3, i.e. when IS coding was present for a section it was essential for the stereo audio spectral values above the IS frequency limit to be IS coded right to the top of the spectral range. The new NBC process need not activate IS coding for the whole spectral range above the IS limit; it allows IS coding to be disconnected if that is signalled. Thus IS coded scale factor bands may alternate with non-coded scale factor bands.

The scale factors transmitted in a section with IS coding for the right channel also constitute the intensity direction information 36, as in prior art, and these values themselves also undergo differential and Huffman coding. As already mentioned, there is a zero spectrum rather than stereo audio spectral values in the right channel, in the scale factor bands above the IS frequency limit 32. The left channel contains the total signal for the left and right channel in IS coded sections. However the total signal is standardised so that its energy within the respective scale factor bands is equal to the energy of the left channel, after IS decoding. In the event of IS coding being used in the decoder the left channel can therefore be taken up unchanged and need not be determined expressly by forming the sum or the difference. The stereo audio spectral values for the right channel can be derived from those for the left channel using the intensity direction information is_pos 36, which is in the side information of the right channel.

Figure 3A:
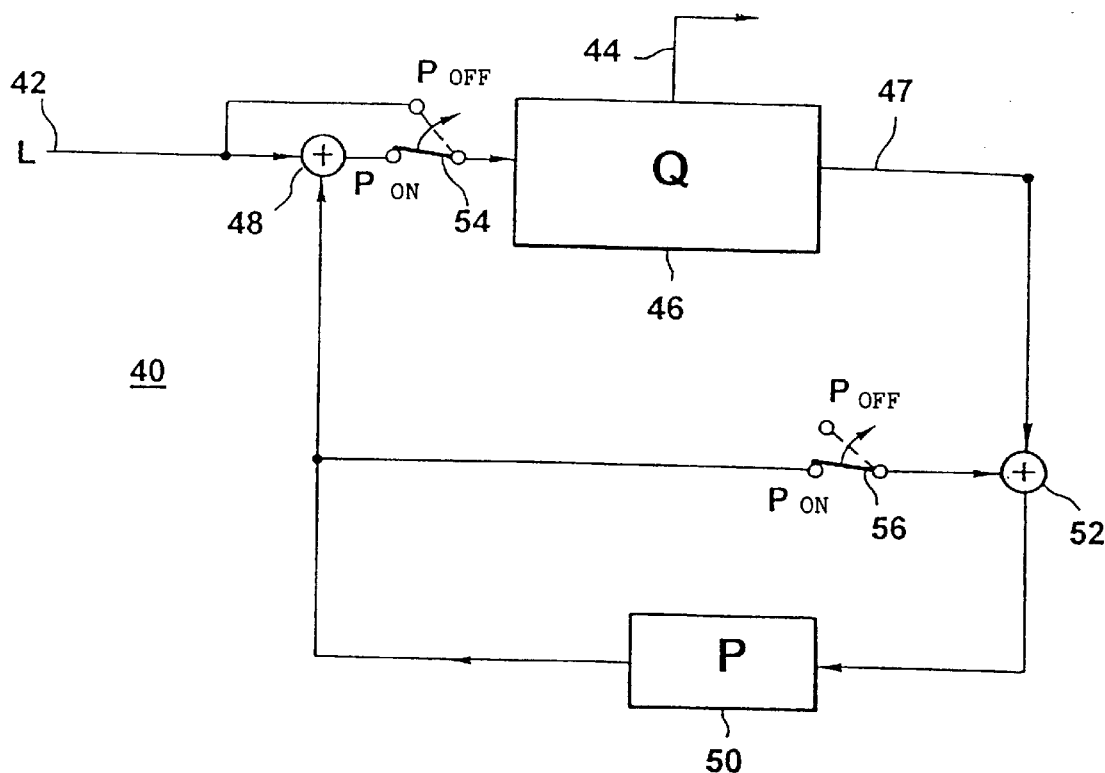
FIG. 3a shows a first version of a predictor for the left channel.

FIG. 3a is a diagram showing a first version of a predictor 40, which has an input 42 into which stereo audio spectral values of the left stereo channel L can be fed. At an output 44 of the predictor 40 the prediction error signals to be transmitted are written to a bit stream, which contains both the coded stereo audio spectral values and the side information on them, scale factor bandwise. Between an input of a quantiser 46 for quantising the prediction error signal and an input 42 of the predictor 40 there is a first summation device 48 which forms a difference between the stereo audio spectral values entered at the input 42 of the predictor 40 and the output values of a predictor 50 (prediction error signal). By analogy with its name the quantiser 46 quantises the stereo audio spectral values and writes the quantised values to the bit stream. Contrary to its name it also simultaneously carries out requantisation, with the requantised stereo audio spectral values being output via its second output 47.

The input of the predictor 50 receives input values formed by a second summation device 52. This second device adds the prediction error signals which are present again in quantised form at an output 47 of the quantiser 46 to the output values of the predictor 50. The sum of the prediction error signal and the prediction estimate is thus an input value for the predictor 50, which is used next time as an input value for it, to estimate a future value.

The predictor 40 is further provided with a first switch 54 and a second switch 56. As already mentioned in prior art, it may be advantageous not to make a prediction for certain scale factor bands, as they contain non-tonal audio data. If a prediction is nevertheless made in these non-tonal scale factor bands, it results in a bit loss, i.e. an increase in the amount of data to be coded instead of a compression thereof. Prediction for the left channel L may be disconnected with the switches 54 and 56. In FIG. 3a the switches 54 and 56 are drawn with a prediction being made for the left channel. It should be pointed out that the switches must only be switched over together. Thus there is no point in throwing one switch and leaving the other in position. If the switches 54 and 56 are moved from the position $P_{ON}$ ($P_{EIN}$) shown in FIG. 3a to their other position $P_{OFF}$ ($P_{AUS}$), the first summation device is bypassed and the stereo audio spectral values thereby pass to the quantiser 46 unpredicted and are written from there to the coded bit stream.

If the switch 54 is in the $P_{OFF}$ position, which means that no prediction is to be made, the stereo audio spectral values pass directly through the quantiser and appear at the second summation device 52—in contrast with the prediction sequence—not as prediction error signals but as actual values, which are fed into the predictor P so that it can adapt to them. If the switch 56 were in the $P_{ON}$ position when the switch 54 is in the $P_{OFF}$ position, the actual prediction signal present at the summation device 52 would be added to another prediction signal via the switch 56, with the result that the predictor P 50 would receive twice the prediction signal as its input signal, leading to incorrect adaptation of its prediction coefficients.

Figure 3B:
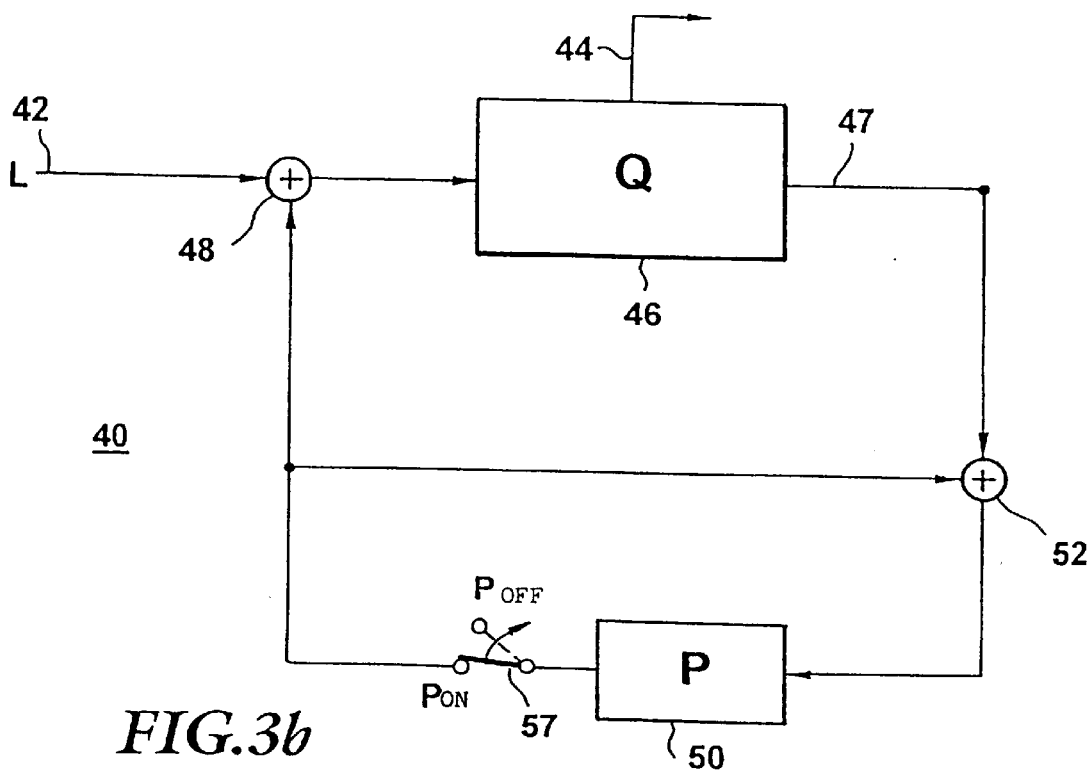
FIG. 3b shows a second version of a predictor for the left channel.

FIG. 3b shows a second version of the predictor for the left channel L, which is similar to the first version but has only one switch 57 instead of the switches 54 and 56. If the switch 57 is in the $P_{ON}$ position the prediction is made as described above with the results being used for coding data. However if the switch 57 is in the $P_{OFF}$ position the predictor in FIG. 3b is deactivated, i.e. although the prediction is made to adapt the prediction coefficients, the results of the prediction are not considered in coding the data.

Figure 4:
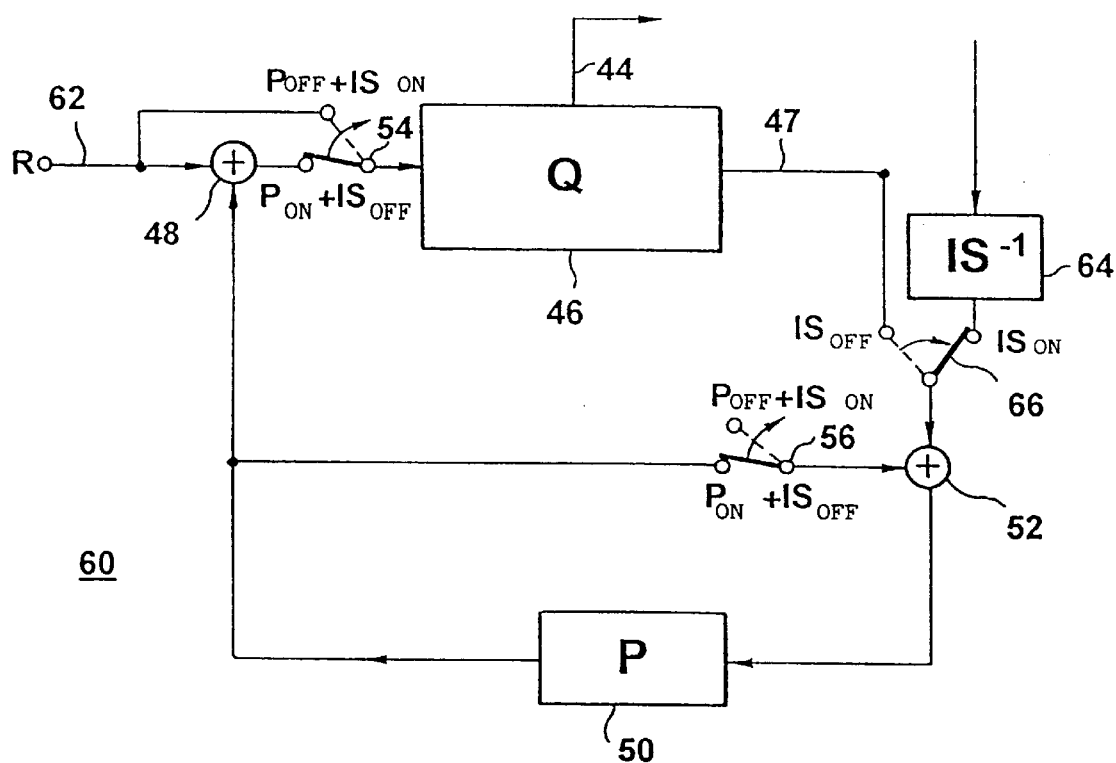
FIG. 4 shows a predictor for the right channel.

In FIG. 4 there are both a predictor 60 for the right channel R, into which stereo audio spectral values 30 are fed via an input 62, and an intensity stereo decoder ($IS^{-1}$) 64. The other components in FIG. 4 are the same as those in FIG. 3a and operate in the same manner. It will be obvious to persons skilled in the art that the second version, in FIG. 3b, may also be used as predictor for the left channel. Unlike the left channel predictor 40 however, the right channel predictor 60 has an additional third switch 66, the operation and use of which will be described below.

As already mentioned, a single prediction in the right channel produces a non-zero error signal with stereo audio spectral values which are intensity stereo coded. If the error signal were written to the bit stream for the right channel the basic intensity stereo condition would be breached, as the stereo audio spectral values in the right channel are set to zero in scale factor bands above the intensity stereo frequency limit. Yet to enable the predictor to adapt correctly to the actual value in the right channel during deactivation, stereo audio spectral values must nevertheless be supplied to it. But as these are coded by the intensity stereo process they must be decoded in the IS decoder 64 and supplied to the predictor 50 of the prediction means 60. The IS decoder 64 thus receives at its input the IS coded stereo audio spectral values of the left channel and the intensity direction information transmitted in the side information for the right channel.

In FIG. 4 the switches 54, 56 and 66 are drawn for a situation where there is intensity stereo coding of the stereo audio spectral values about to be processed. As already mentioned, prediction must be cut out in this situation, and hence the switches 54 and 56 are in the $P_{OFF}$ and $P_{ON}$ positions. Scale factor bands which are not coded may be subjected to prediction in both the left and the right channel in order to reduce the amount of data decoded. In that event the switches 54, 56 and 66 are respectively moved to the $P_{ON}+IS_{OFF}$ ($IS_{AUS}$) and $IS_{OFF}$ positions. In a preferred embodiment of the invention the predictor only ever sees the real left or right channel. Potential MS coding is accordingly also carried out in the quantiser Q 46, i.e. after the prediction.

The third switch 66 is again connected to the output 47 of the quantiser 46, with the result that the prediction error signals written to the bit stream which appears at the output 44 of the quantiser again flow through the switch. The intensity stereo decoder 64 is not active in this case, as there are no intensity stereo coded data.

Figure 5:
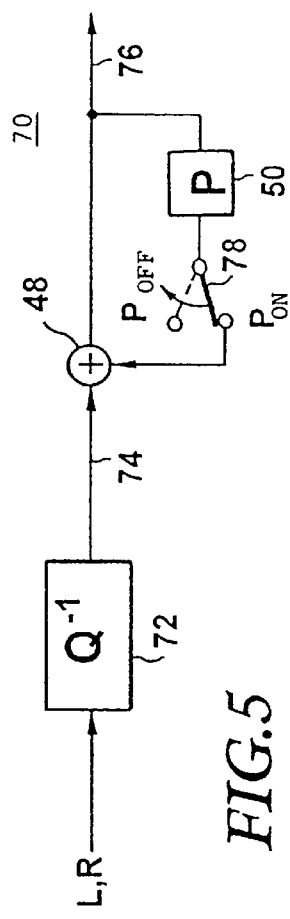
FIG. 5 shows a predictor for decoding coded stereo audio spectral values.

FIG. 5 shows the theoretical construction of a re-predictor 70, which has a structure similar to the predictor 40 for the left channel and the predictor 60 for the right channel. The stereo audio spectral values to be decoded first pass into a dequantiser $Q^{-1}$ 72, which cancels the quantising introduced in the quantiser 46. The dequantised stereo audio spectral values which still have a prediction, i.e. the prediction error signals, then pass to an input 74 of the re-predictor 70.

The first summation device 48 and the actual predictor 50 are identical with the previously described devices with the same references. The sum of the requantised prediction error signal and the prediction estimate, which is the output value of the predictor P 50, is formed at the summation device 48. This sum is used as the next input signal to the predictor P 50 and is output as a re-predicted signal at an output 76 of the re-predictor 70, if a fourth switch 78 is in the $P_{ON}$ position drawn in FIG. 5, indicating that the data about to be processed has been subjected to prediction. The switch 78 ensures that the predictor P 50 can always adapt its prediction coefficients in spite of any deactivation of the prediction.

If it is ascertained from the side information of the stereo audio spectral values that the data about to be processed have not been subjected to prediction, the fourth switch 78 is moved to its $P_{OFF}$ position, so that the output of the predictor P is no longer connected to the summating device 48. In contrast with the situation previously described, the quantiser then quantises not prediction error signals but the actual stereo audio spectral values with prediction connected. With the output of the predictor P 50 separated from the first summation device 48, i.e. with the predictor P deactivated, uncoded stereo audio spectral values thus appear at the output of the re-predictor 76. They can be converted to the time domain in a manner known in the art, to obtain discrete-time audio signals.

Figure 6:
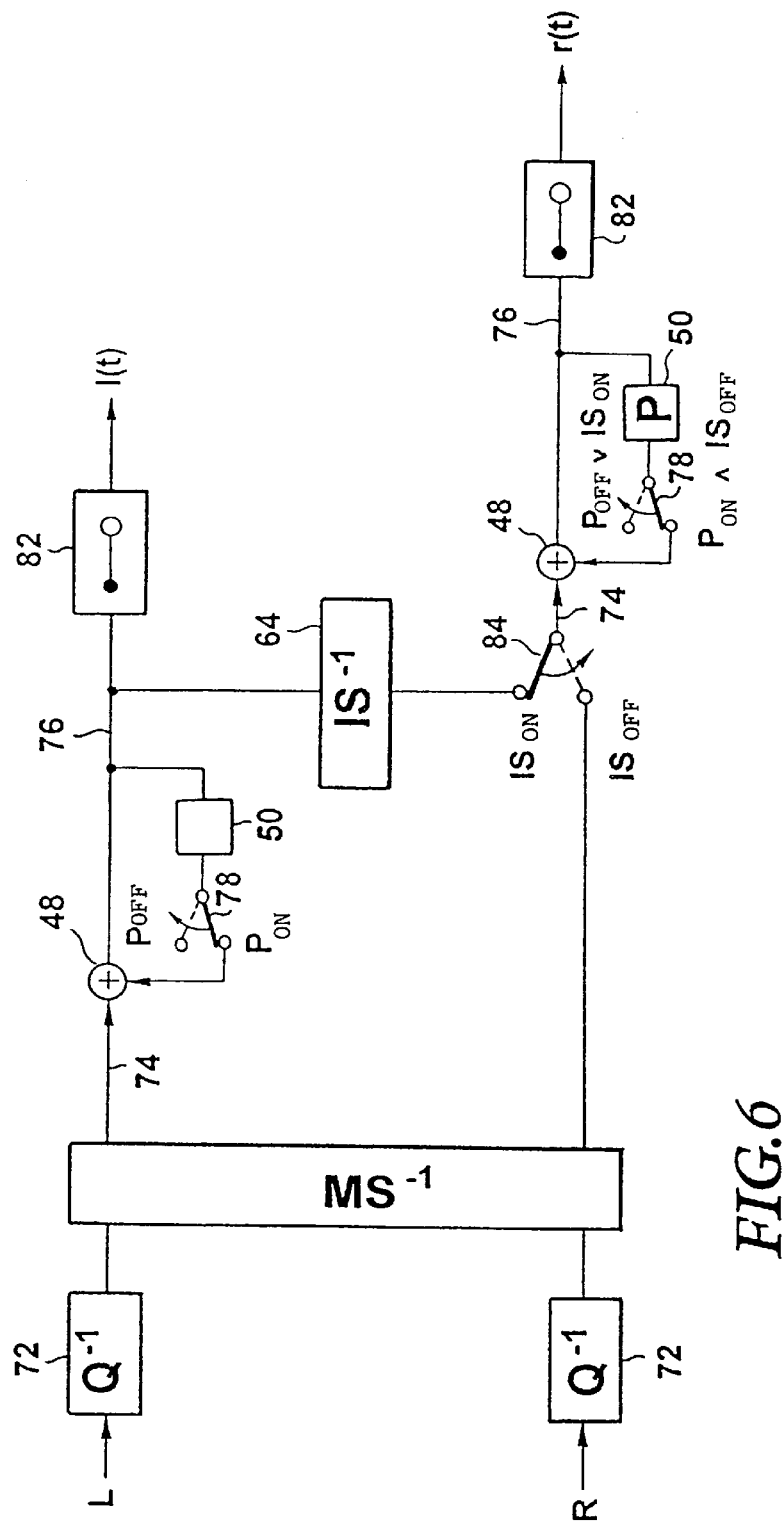
FIG. 6 is a block circuit diagram showing a decoder for decoding coded stereo audio spectral values.

It should be pointed out here that the predictors P 50 of the decoder in FIGS. 5 and 6 are identical with the predictors P 50 shown in FIGS. 3 and 4. Owing to the fact that the corresponding predictors 50 in the coder and decoder receive exactly the same value for their input value, it is not necessary to transfer the predictor coefficients used, as each predictor can calculate them itself, in line with the principle of backward adaptation. "Second order backward adaptation" means that two preceding values are used for an estimate made, and are weighted by means of the calculated, i.e. adapted prediction coefficients in a manner known in the art, to produce a new estimate.

FIG. 6 shows a preferred embodiment of an apparatus for decoding stereo audio spectral values which have been encoded partly in the intensity stereo process and partly by means of a prediction. The values thus encoded in the left (L) and right (R) channel are fed into the respective dequantisers 72. The dequantised values of the two channels, which may e.g. be M-S-coded, are then decoded in an M-S decoder 80. It will be obvious to persons skilled in the art that it is not essential for stereo audio spectral values to be coded by the middle-side process within ranges which are not intensity stereo coded, in order to carry out the invention. This is however advantageous for reducing the amount of data.

In a preferred embodiment of the invention the stereo audio spectral values thus coded may have prediction coding in the left channel L in one or more scale factor bands. In that case the fourth switch 78 in the left channel L is in the $P_{OFF}$ position drawn in FIG. 6. The stereo audio spectral values in uncoded form are behind the fourth switch 78 in the left channel L. They may be converted to discrete-time audio signals by a suitable frequency domain/time domain converter 82.

As already described at the beginning, a preferred embodiment of the invention uses an intensity stereo coding where the stereo audio spectral values in the left channel contain the sum of the values of the left and right channel. In a preferred embodiment of the invention these are standardised so that their energy corresponds to that of the left channel, thus obviating the need for recovery in the decoder. A different intensity stereo process may however be used, in which standardisation of the total signal in the left channel is not carried out so that its energy corresponds to that of the original left channel. If this is the case the stereo audio spectral values, which are then behind the fourth switch 78 in the left channel L, must be subjected to intensity stereo decoding including access to the side information of the right channel, in which the intensity direction information is present as already described.

The stereo audio spectral values in the right channel R, which have been M-S decoded if necessary, meet a fifth switch 84, in this case in the $IS_{OFF}$ position, whereby these values are re-predicted by the re-predictor 70 and fed through the fourth switch 78 in the $P_{ON}$ position into the frequency domain/time domain converter 82, thus producing discrete-time stereo audio signals r(t) for the right channel.

It will be obvious to persons skilled in the art that if intensity stereo coding is present in a scale factor band no MS decoding is carried out for that band, as the two coding processes cannot be used simultaneously. The MS decoder will react to side information in the two channels by letting IS coded stereo audio spectral values pass through unchanged.

As already mentioned, there are no IS coded stereo audio spectral values in the right channel R. The right channel R only has the intensity direction information is_pos as side information. In order to decode the IS coded stereo audio spectral values such values present in the left channel L are subjected to IS decoding in the IS decoder 64, which also has access to the side information in the right channel. The right channel values thus IS decoded pass through the fifth switch 84, which is now in the $IS_{ON}$ position, into the re-predictor 70 of the right channel R. However, since data for the right channel is never subjected to prediction when IS coding is present, as the channel essentially has a zero spectrum, the fourth switch 78 in the channel R is in the $IS_{ON}$ position, thus bypassing the predictor P 50 and the first summation device in the channel R. As the stereo audio spectral values for the right channel R which are decoded in the IS decoder 64 cannot undergo prediction, they are fed unchanged through the switch 84 into the right channel R of the frequency domain/time domain converter 82, which in a preferred embodiment may be an inverse filter bank, as the output of the predictor P through the switch 78 is deactivated, to give discrete-time decoded audio signals r(t).

Figure 1:
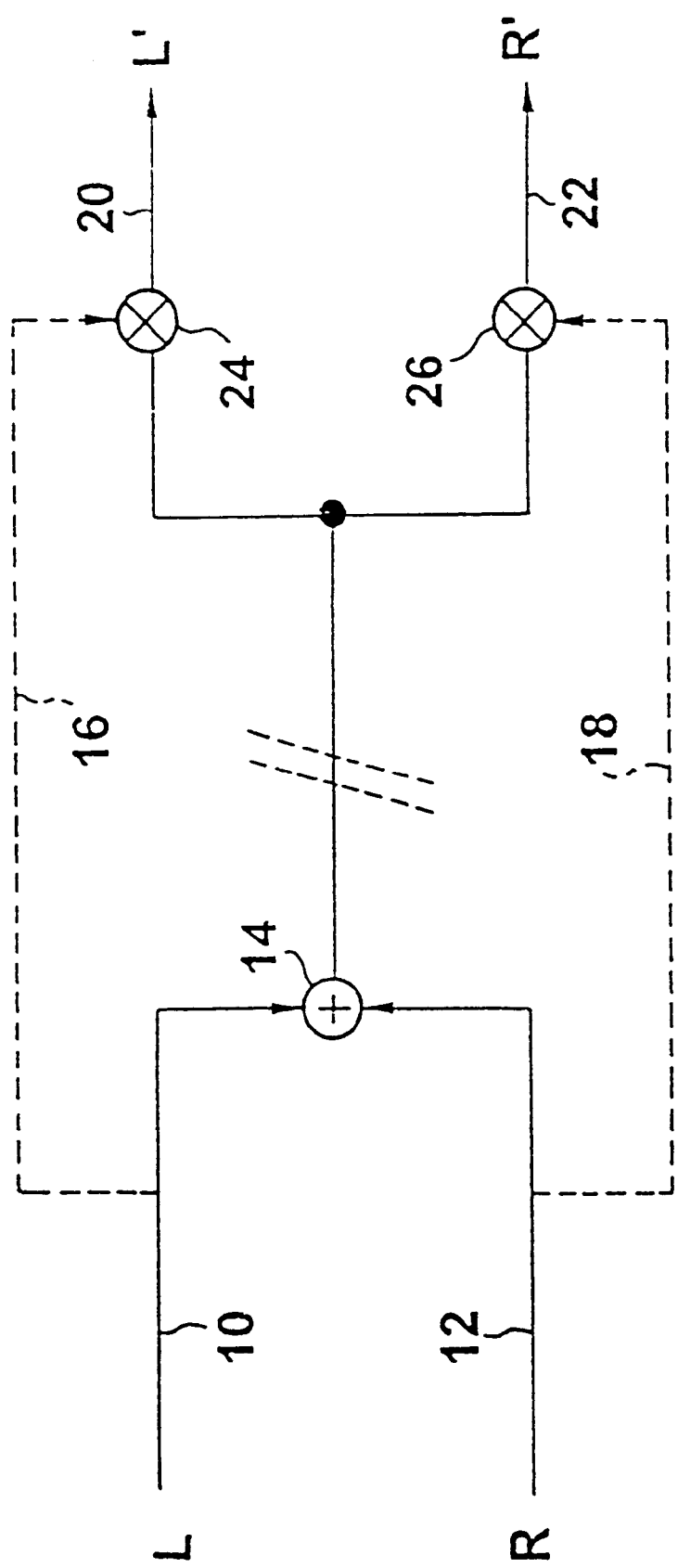
FIG. 1 is a theoretical circuit diagram for state of the art intensity stereo coding.

In contrast with the intensity process to MPEG Layer 2 standard shown in FIG. 1, where the intensity direction information is transferred not by means of intensity direction information but by means of two separate scale factors for the left and right channel, NBC coding or decoding requires the transfer of intensity direction information is_pos for the following reasons, as already mentioned several times.

If the left channel only transmits zeros the arrangement takes the scaling information as being irrelevant. But this is not always the case with prediction; as a result of prediction the prediction error signal at the predictor output need not necessarily be zero. Scale factors might then have to be multiplied. It may also happen that spectral values within one or more scale factor bands, which are quantised by the prediction, are found to be zero. The syntax of the NBC process then provides for no scale factor to be transmitted in that event. There would then be no direction either for the IS coded stereo audio spectral values, and this would lead to complete destruction of the stereo image for those values.

The use of intensity direction information instead of two scale factors allows differential coding instead of absolute coding of that information, for further reduction of the amount of data coded. With scale factors within ranges which are not IS coded, the very first value to appear, or the initial value is a magnitude quantised to 8 bit. With IS coded stereo audio spectral values the first or initial value is zero. IS scale factors and "normal" scale factors may appear alternately in the coded bit stream. Thus two status machines or differential PCM coders are required for coding; in each case they note the last value of the two factors, in order to calculate the next values from the following equations (7) and (8).

$$dscf(n)=scf(n)-scf(n-1) \tag{7}$$

$$dint\_pos=int\_pos(n)-int\_posn-1) \tag{8}$$

scf(n) represents the scale factor of the scale factor band just considered, while scf (n−1) represents the scale factor of the previous band; dscf(n) is therefore the difference in said magnitude which has to be coded. Similarly dint_pos is the difference between the nearest whole numbers for the intensity direction information is_pos of the scale factor band n considered and the is-pos of the last scale factor band n−1.

The IS direction information for the decoder is calculated in a similar way; equations (7) and (8) for the decoder are as follows:

$$scf(n)=dscf(n)-scf(n-1) \tag{9}$$

$$int\_pos=dint\_pos(n)+int\_pos(n-1) \tag{10}$$

The decoder, using two differential PCM decoders, calculates the scale factor value and the intensity direction information of the scale factor band just considered, by adding the values of the previous scale factor band to the respective actual difference in the decoder.

What is claimed is:

1. A method of coding stereo audio spectral values, to obtain coded stereo audio spectral values, comprising the following steps:
   grouping the stereo audio spectral values in scale factor bands, with which scale factors are associated;
   intensity stereo coding the stereo audio spectral values in at least one of the scale factor bands, whereby one channel has intensity stereo coded stereo audio spectral values and another channel has stereo audio spectral values with a value of substantially zero;
   if the stereo audio spectral values in a scale factor band are intensity stereo coded,
      intensity stereo decoding the intensity stereo coded stereo audio spectral values of one channel in the scale factor band, to obtain intensity stereo decoded stereo audio spectral values for the other channel;
      making a first prediction with the intensity stereo decoded stereo audio spectral values of the other channel in the scale factor band, the results of the first prediction not being taken into account when the stereo audio spectral values of the other channel are coded;
   if the stereo audio spectral values in a scale factor band are not intensity stereo coded,
      making the first prediction with the stereo audio spectral values of the other channel in the scale factor band, to obtain the coded stereo audio spectral values of the other channel.

2. The method according to claim 1, further comprising the following step:
   making a second prediction of the stereo audio spectral values independently of existing intensity stereo coding, to form the coded stereo audio spectral values of one channel.
3. The method according to claim 1,
   wherein the first and second prediction are second-order, backward adaptive predictions.
4. The method according to claim 1,
   wherein the results of the first and second prediction are quantised and written to a coded bit stream.
5. The method according to claim 1,
   wherein the results of the first and second prediction for non-tonal stereo audio spectral values for each scale factor band are taken into account selectively or are not taken into account.
6. The method according to claim 1,
   wherein the coding of the stereo audio spectral values by the intensity stereo process in a scale factor band includes the production of intensity direction information for that band.
7. The method according to claim 6,
   wherein the intensity direction information for a scale factor band is coded differentially, beginning with a starting value.
8. The method according to claim 1,
   wherein stereo audio spectral values in scale factor bands which are not intensity stereo coded are coded by the middle-side process, the scale factors for each channel which are associated with these bands being coded differentially beginning with a starting value.
9. The method according to claim 1,
   wherein the first or second prediction produces current estimates from preceding input values, from which estimates a respective current actual value is subtracted, to produce a prediction error signal which is coded in a bit stream instead of the current actual value.
10. A method of decoding stereo audio spectral values which are coded partly by the intensity stereo process and partly by means of a first and a second prediction and which have side information, comprising the following steps:
   ascertaining the presence of intensity stereo coding or of the first or second prediction of the stereo audio spectral values, which are grouped in scale factor bands, for each individual band on the basis of the side information;
   making a prediction corresponding to the second prediction, with stereo audio spectral values coded by means of the second prediction, in one channel, in order to cancel the second prediction;
   if there is intensity stereo coding in a scale factor band, carrying out intensity stereo decoding of the intensity stereo coded stereo audio spectral values of the one channel, to form intensity stereo decoded stereo audio spectral values for the other channel;
   making the prediction corresponding to the first prediction, with the intensity stereo decoded stereo audio spectral values of the other channel, the results of the prediction not being taken into account with decoded stereo audio spectral values of the other channel;
   if there is no intensity stereo coding in a scale factor band, making the prediction corresponding to the first prediction, in the other channel to form the decoded stereo audio spectral values of the other channel.

11. The method according to claim 10,
   wherein, although the prediction corresponding to the second prediction is made, the results thereof are not taken into account if the side information for a scale band factor indicates that there is no prediction of the stereo audio spectral values in the band for one channel.
12. The method according to claim 10,
   wherein, although the prediction corresponding to the first prediction is made, the results thereof are not taken into account if the side information for a scale band factor indicates that there is no prediction of the stereo audio spectral values in the band for the other channel.
13. Apparatus for coding stereo audio spectral values, comprising:
   a means for grouping the stereo audio spectral values in scale factor bands, with which scale factors are associated;
   an intensity stereo coder for coding the stereo audio spectral values in at least one of the scale factor bands, whereby one channel has intensity stereo coded stereo audio spectral values and the other channel has stereo audio spectral values with a value of substantially zero;
   an intensity stereo decoder for decoding the intensity stereo coded stereo audio spectral values in a scale factor band; and
   a first predictor in the other channel, which has a first, second and third switch, the first, second and third switches being in a first state when intensity stereo coded stereo audio spectral values are present, and the first, second and third switches being in a second state when no intensity stereo coded stereo audio spectral values are present;
   wherein the first predictor makes a first prediction with the stereo audio spectral values of the other channel, decoded by the intensity stereo decoder, when the first, second and third switches are in the first state, but wherein the results of the prediction are not taken into account with the coded stereo audio spectral values owing to the position of the first switch; and
   wherein the predictor makes the first prediction of the stereo audio spectral values in the scale factor band, to obtain the coded stereo audio spectral values of the other channel, when the first, second and third switches are in the second state.
14. The apparatus according to claim 13,
   further comprising a second predictor for making a second prediction of the stereo audio spectral values in a scale factor band independently of the presence of intensity stereo coding, to form the coded stereo audio spectral values of one channel.
15. Apparatus for decoding stereo audio spectral values which are coded at least partly by the intensity stereo process and a first and a second prediction and which have side information, comprising:
   a first re-predictor for one channel of stereo audio spectral values with an input and an output;
   a second re-predictor for another channel of stereo audio spectral values with an input and an output;
   an intensity stereo decoder with an input and an output;
   a first change-over means in the other channel for connecting the output of the intensity stereo decoder to the input of the second re-predictor when intensity stereo coded stereo audio spectral values are present, and for connecting the input of the second re-predictor to the other channel of stereo audio spectral values when those values are not stereo intensity coded; and a second change-over means in the other channel for connecting the output of the second re-predictor in the other channel to an output for decoded stereo audio spectral values of the other channel, when the stereo audio spectral values are not intensity stereo coded, and for connecting the input of the second predictor in the other channel to the output for the decoded stereo audio spectral values of the other channel, when those values are intensity stereo coded.

16. The apparatus according to claim 15, wherein the re-predictor in one channel has a third switch and a predictor, the third switch separating an output of the predictor from the first channel, whereby the results of the prediction by the re-predictor are not taken into account.

* * * * *